Feb. 2, 1937.                S. M. ROBERTS                2,069,682
                            SIGNALING DEVICE
                          Filed Dec. 18, 1933           2 Sheets-Sheet 1
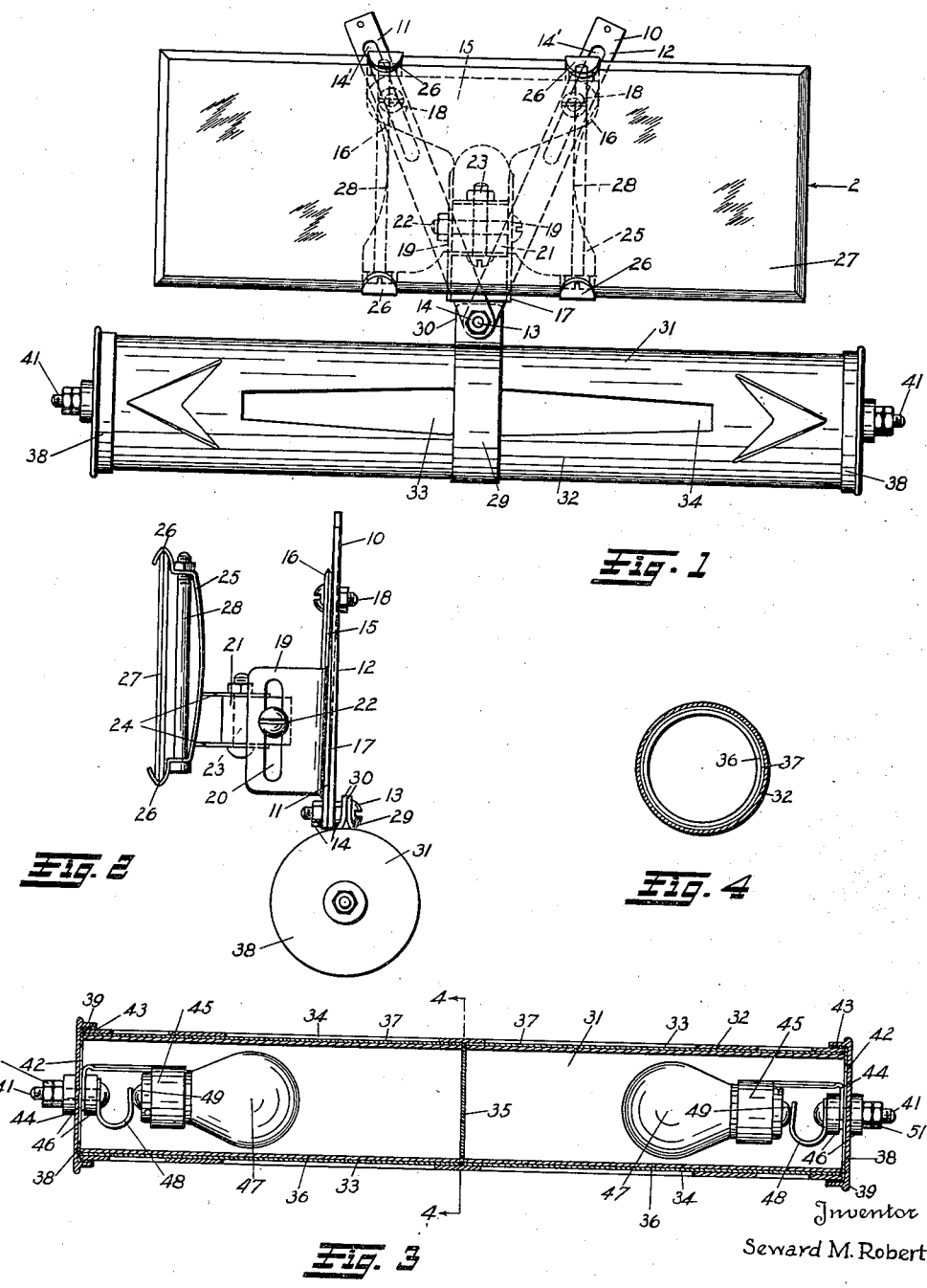
Inventor
Seward M. Roberts
By
Strauch & Hoffman
Attorney Feb. 2, 1937.  S. M. ROBERTS  2,069,682
SIGNALING DEVICE
Filed Dec. 18, 1933  2 Sheets-Sheet 2
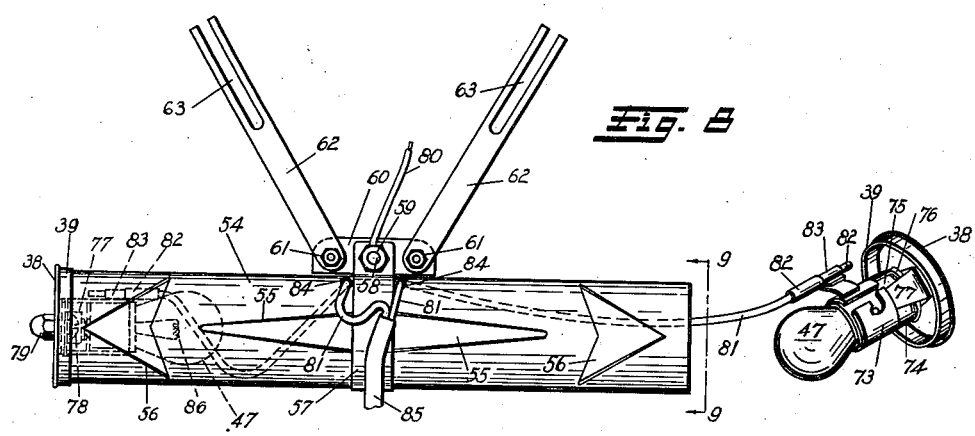
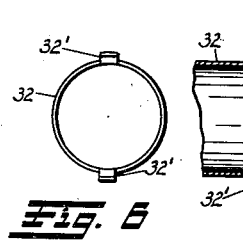
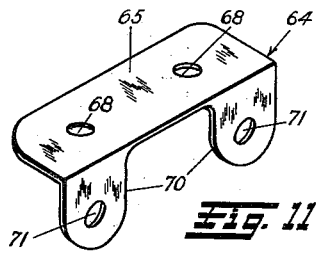
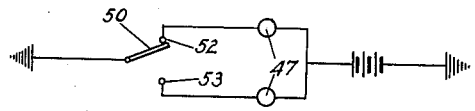
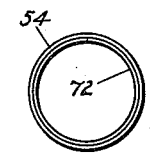
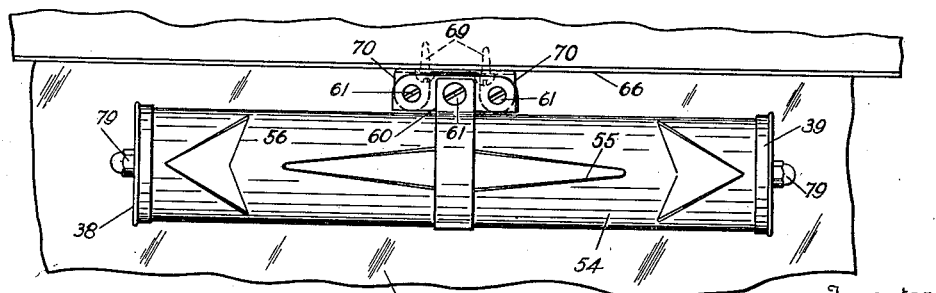
Inventor
Seward M. Roberts
By  Strauch & Hoffman
Attorney Patented Feb. 2, 1937

2,069,682

UNITED STATES PATENT OFFICE 2,069,682

SIGNALING DEVICE

Seward M. Roberts, Maplewood, N. J.

Application December 18, 1933, Serial No. 702,987

5 Claims. (Cl. 177—329)

This invention relates to a direction signaling device, and the present application is in part a continuation of my co-pending case, Serial Number 257,650, filed February 28, 1928.

More specifically, the invention relates to a direction signaling device especially adapted for automobiles, to indicate the direction in which the driver intends to turn; and the primary object is to devise a novel and improved signaling device of this nature.

Another object of my invention is the provision of a direction signaling device for automobiles, which is of such construction and adapted to be so mounted that the direction in which the driver of the automobile intends to turn is simultaneously indicated both to the front and to the rear of the automobile.

A further major object of the present invention is the provision of a direction signaling device for automobiles adapted to be mounted within the vehicle body adjacent the line of sight between the rear view mirror and the rear window whereby it is visible through the rear window of the automobile, whereby it will indicate a desired change in direction both to the front and to the rear of the automobile, and whereby the device itself will serve as a pilot light to keep the driver informed as to the operating condition thereof.

Another very important object of the invention is the provision of a signaling device comprising an open casing having indices visible therethrough, and an end cap for the casing carrying a lamp adapted to rest within the casing and illuminate the indices upon application of the cap to the casing.

A further important object of the present invention is to devise a cylindrical direction indicator having a central transverse partition dividing it into right and left chambers, and lamps disposed in the respective chambers for completing right and left turn signals. In this connection, it is an object to carry the lamps on readily removable end caps for the chambers, thus facilitating assembly and lamp replacement.

Another major object of my invention is to form a direction indicator from a casing having a pair of liners disposed on opposite sides of a lateral partition, the partition being loose and free with respect to the casing and held in position within the latter by contact with the inner or adjacent ends of the liners.

Another object is to devise novel and improved mountings and wiring arrangements for signal lamps.

A still further object of the invention resides in the provision of a novel form of mounting means for supporting a direction signaling device.

With these objects in view, as well as others as will become apparent from the following disclosure, reference will be had to the accompanying drawings forming a part thereof, and in which:

Figure 1 is a front elevational view of a rear view mirror and a direction signaling device jointly supported by a bracket adapted for connection with the body of an automobile above the windshield.

Figure 2 is an end view thereof, looking in the direction of the arrow 2 in Figure 1.

Figure 3 is a longitudinal sectional view through the cylindrical indicating member of the signaling device.

Figure 4 is a transverse sectional view on line 4—4 of Figure 3 looking in the direction of the arrows.

Figure 5 is a wiring diagram of the electrical circuit into which the lamps of the device are connected.

Figure 6 is an end view of the shell showing a modified means for holding the end caps in position.

Figure 7 is a longitudinal sectional view taken centrally and vertically through the device of Figure 6.

Figure 8 is a rear elevational view, with one of the end caps removed and shown in perspective, of a device similar to that of Figure 1 but embodying modifications in certain of the parts.

Figure 9 is an end view of one end of the signal casing of Figure 8, as seen when looking upon the plane of line 9—9, Figure 8.

Figure 10 is a front elevational view of the modified device of Figure 8, with a substituted form of mounting for positioning it in the rear window of a vehicle body.

Figure 11 is a perspective view of a bracket which forms the substituted mounting means of Figure 10.

In the drawings, wherein like reference numerals are employed throughout to designate like parts, Figures 1 to 7, inclusive, have been carried forward from my above mentioned copending application without any structural changes. These old forms accordingly will be described first.

With particular reference for the moment to Figures 1 to 4, inclusive, numeral 10 designates a bracket which comprises a pair of bars 11 and 12 whose inner ends are overlapped and provided with aligned apertures through which extends a bolt 13 provided with nuts 14 engaging opposite faces of bars 11 and 12. The bars 11 and 12 diverge outwardly from their connected inner ends and are each provided with an elongated slot 14' adjacent the outer end thereof. Resting against and secured to the front faces of bars 11 and 12 is a plate 15 which comprises laterally projecting ears 16 and a downwardly extending tongue 17. Ears 16 are apertured for the reception of bolts 18 which extend through slots 14' and which serve for attaching bracket 10 to the top cross bar of an open car as shown in Figure 7 or to the body above the windshield in a closed car. The provision of slots 14' and pivoted connection provided by bolt 13 permits ready adjustment of bracket 10 whereby any mirror which has been in use can be supported by bracket 10 which in turn can be secured in position by the same screws or bolts formerly used in their same positions. Tongue 17 is provided with opposite forwardly projecting flanges 19 which are in turn provided with transversely aligned, vertically extending slots 20.

Disposed between flanges 19 is a pivot block 21 which is transversely apertured for reception of a bolt 22 adapted to extend through slots 20 for pivotally and adjustably securing block 21 between flanges 19. Block 21 is further provided with a vertical aperture for reception of a bolt 23 which also extends through vertically spaced flanges 24 engaging opposite faces of block 21 and carried by a mirror supporting plate 25. The connection between block 21 and flanges 24 provides for a lateral pivoting movement of plate 25. Plate 25 is provided with mirror engaging lugs 26 which are adapted to support a mirror 27 and held in engagement therewith by means of bolts 28 which extend through oppositely positioned lugs 26, as is clearly shown in Figures 1 and 2.

Supported from the lower connected ends of bars 11 and 12 is a cylindrical member 29 provided with apertured ears 30 adapted to be brought into engagement to receive bolt 13 which connects the inner ends of bars 11 and 12 as is clearly shown in Figure 2. The clip member is accordingly connected with the bars 11 and 12 for pivotal movement relative thereto. Engaged by clip 29 is a cylindrical indicating member 31 comprising an open ended cylindrical shell 32 which, as shown in Figure 1 and Figure 3, is provided with cut out portions at opposite sides thereof defining a pair of broken arrows 33 and 34 in each opposite side thereof, arrow 33 pointing to the left and arrow 34 pointing to the right. Removably and loosely disposed within the shell 32 is a partition 35 which is retained in position centrally of the length of shell 32 by engagement therewith of the adjacent ends of removable cylindrical transparent members 36 whose opposite ends terminate flush with the opposite ends of shell 32.

Removably disposed between members 36 and shell 32 and co-extensive with members 36 is a pair of cylindrical light screens 37, each of which is preferably formed by rolling a rectangular piece of suitable paper into cylindrical form and entering it into shell 32 with the corresponding member 36.

The screens 37 are adapted to provide any desired color of light and eliminate excessive brightness of the light.

The cylindrical members 36 may be so constructed as to diffuse the light and avoid excessive glare or brightness and may also be such as to provide any desired color of light, in which event the screens 37 may be dispensed with. Preferably, however, both sets of sleeves 36 and 37 are used so that one of them will impart color to the transmitted light while the other will prevent the indices from being too plainly visible when the lamps are unlighted.

The ends of shell 32 are closed by means of removable caps 38, each of which is provided with a marginal flange 39 for engagement with the outer face of shell 32. Each cap 38 is centrally apertured for reception of a screw bolt 41 which extends through an aperture in a diametrically extending strip 42 disposed in engagement with the inner face of cap 38 and provided with a yieldable extension 43 adapted to rest between flange 39 and shell 32 to yieldably hold cap 38 in engagement with shell 32. The bolt 41 further extends through a leg 44 of a light retaining bracket 45 and a pair of insulating washers 46 engage bolt 41 on opposite faces of cap 38 and leg 44. A suitable light 47 is detachably supported by each bracket 45 and a yieldable contact member 48 is supported by each bolt 41 in engagement with the inner insulating washer 46 adapted to engage the contact point 49 of light 47. Each bolt 41 is provided with nuts 51 adapted to be turned up against outer insulating washer 46 to securely bind strip 42, bracket 45, and contact member 48 in engagement with cap 38. It will be noted that broken arrows 33 and 34 provide considerable space between the heads and bodies thereof which prevents a glare from lights 47 to properly diffuse the light.

The bracket 10 is adapted to be suitably supported from the upper transverse member of any windshield frame of a closed vehicle body, or to the front cross member of a wooden top frame by means of screws or other suitable securing elements engaging the upper apertured ends of bars 11 and 12, and the lights 47 are controlled by means of any suitable switch 50 under automatic control or under manual control of the operator. These details directly form no part of the present invention and are fully illustrated in the aforementioned copending application.

The signaling device is wired as indicated in Figure 5, wherein bracket 10 is connected to the positive terminal of a battery 51. The lights 47 are connected to corresponding contacts 52 and 53 of switch 50 which is grounded, as shown, thus completing the circuit through the lights 47 with the negative terminal of the battery. The circuit may be modified in detail in various ways, as will be readily appreciated.

In operation, the signaling device, together with the mirror 27, is supported in the usual position of a rear view mirror, by connecting the outer ends of bars 11 and 12 of bracket 10 to the upper side of the windshield frame, thus positioning the indicating member 31 so that it is visible from the rear of the automobile in which it is mounted through the rear window, and also visible from the front of the automobile through the windshield.

The bracket 10 not only supports the mirror and indicating member within the windshield, but it provides an adjustment for the mirror through the slots 20 and a two-way pivotal action through bolts 22 and 23 in member 21, and further provides an adjustable pivotal connection at 13 for the indicating member 31.

The signaling device supported as above stated, the switch 50 is suitably disposed,—preferably in the form of a manually operable knob on the gear shift lever as disclosed in my said copending application,— and the signaling device and switch connected as above described and diagrammatically illustrated in Figure 5.

The driver of the automobile upon intention of making a turn to the left or to the right manipulates the switch in a direction corresponding to that in which he intends to turn, thus closing the circuit through either of the lights 47 to thereby illuminate the arrows at either end of shell 32 and on opposite sides thereof. This will visibly indicate the direction in which the driver intends to turn both from the rear and from the front of the automobile.

The indicating member 31 as clearly shown in Figure 3 consists of relatively few simple parts and is easily and quickly assembled and disassembled.

In Figures 6 and 7 is disclosed a modified means for holding the end caps in position wherein shell 32 at each end thereof is provided with a pair of diametrically opposite outwardly punched lips 32' adapted to yieldably engage the inwardly converging flanges 39' of end caps 38 to hold the caps in position.

Certain makes of automobiles are provided with rear windows which are comparatively small and of such a design that the visibility of the indicating member 31 suspended from the windshield would be somewhat restricted from the rear, in which cases an additional similar indicating member may be attached inside the rear window at the top and center thereof. A preferred method of making this attachment is illustrated in Figures 10 and 11, later to be described.

When employing an additional indicating member, one set of arrows in each member will be blocked off preferably by inserting a tube within the shell 32 of each indicating member 31 having one side opaque and the other side transparent or translucent, the opaque side blocking off one set of arrows such that right and left arrows will be visible in front from the indicating member suspended from the windshield, and right and left arrows will be visible in the rear from the indicating member attached to the rear window. It will, of course, be understood that both indicating members will be simultaneously operated by the switch 50, as one of the additional lamps will be included in each branch of the circuit shown in Figure 5 between the battery and one of the contacts 52 or 53.

The signaling device may of course be initially manufactured with indicating arrows on one side only of the casing; and it will further be obvious that the devices may be used in pairs as above stated, or singly at either the windshield or the rear window, regardless of whether or not visible indications are rendered both forwardly and rearwardly. Moreover, the device is capable of use, preferably with slight modifications to render it more perfectly waterproof, in various mounted positions exterior of the vehicle body.

With reference now to Figure 8, which discloses an embodiment involving slight modifications of the signal casing structure above described, the view represents what is preferably the side which faces the windshield. The several involved changes will appear in the following description.

An opaque, preferably metallic, cylinder 54 is partitioned centrally as described under Figure 1, and provided with cut-out arrows comprising shanks 55 and heads 56 on each side of the partition. A metal clip in the form of a band 57 encircles the central part of the cylinder and is secured, by means of a screw 58 and nut 59, to the middle of a flat, horizontal, fibrous cross-arm 60. Equally spaced from the screw 58 is a pair of screw and nut assemblies 61 for pivotally connecting the ends of the arm 60 with the lower ends of a pair of bars or links 62. These bars 62 correspond with the bars 10 of Figure 1 but represent an improvement thereover because their open slots 63 facilitate assembly and adjustment; and because the two-point pivot substituted at the lower ends of the bars 62 for the single-point pivot of Figure 1, provides a more stable support for the cylinder. Furthermore, the fibrous insulating arm 60 permits installation of the device in cars having grounded steel bodies as will be clear from later description of the circuit.

The cylinder may be mounted with any other suitable means. For example, if the device is to be used in the rear window of the vehicle as in Figure 10, a bracket 64 (see also Figure 11) is substituted for the links 62. The bracket 64 has a flat portion designed to seat horizontally against the under side 66 of the upper part of the moulding which surrounds the rear window glass 67, and is provided with apertures 68 which permit screws 69 to secure it to the moulding. The bracket has a pair of downwardly projecting ears 70, apertured as at 71 so that the screw and nut assemblies 61 of Figure 8 may be used to secure the fibrous arm 60 to the ears.

Figure 9 shows that a single translucent sleeve 72 may be substituted for the two sleeves 36 and 37 of Figure 3. There are, of course, a pair of sleeves 72, one in each end of the cylinder, with their adjacent ends abutting the central partition to position the latter. However, as previously indicated, it is preferable to utilize a pair of concentric sleeves in each end of the cylinder,— the outer one of the pair being substantially transparent and having a color closely simulating that of the cylinder so that the arrow will hardly be perceptible when there is no internal illumination, and the inner sleeve being colored translucently for signaling purposes.

The ends of the cylinder are closed by caps 38 which have cylindrical flanges 39 designed to telescope or snap over the cylinder ends with a close friction fit and thus hold the sleeves 72 in position against the central partition. The caps further serve as convenient supports for the lamps 47 and permit the latter to be very easily replaced, as was also true of the form previously described.

Each lamp mounting comprises a bayonet-slotted socket 73 having a U-shaped base 74; a pair of insulating washers 75 and 76 receiving the flat bottom of the U-shaped base between them in parallelism with the body of the end cap; a resilient brass conducting strip 77 having one end fitted between washer 76 and the cap and having its other end in engagement with the conventional central contact element of the lamp; and a screw 78 projecting through the washer 75, the base 74, the washer 76 and the central area of the cap to receive a securing nut 79.

A preferred method of selectively supplying current to the lamps is illustrated in Figure 8. A connection from the positive side of the automobile battery to the two strips 77 of the lamp mountings may be made with a single wire leading to any point on the cylinder such, for example, as the insulated wire 80 which has its terminal secured to the supporting clip 57 by the nut 59. The other ends of the lamp filaments may be grounded selectively by the switch 50

(Figure 5), by virtue of a pair of insulated wires 81 (Figure 8) connected between the lamp sockets 73 and the switch contacts 52 and 53 (Figure 5). The wire terminals seen in Figure 8 have metal tips 82 which are detachably projected into close frictional connection with a pair of brass clips 83 which are soldered or otherwise secured to the respective lamp sockets 73.

The wires 81 preferably are led into the cylinder by way of small apertures 84 formed in the cylinder at points closely adjacent the band 57 and the nut 59, and thence into connection with the clips 83. A conduit 85, larger than apertures 84, surrounds the wires outside the casing but it is cut back far enough to permit the wires to be drawn through the apertures until their terminals project out through the cylinder ends for convenient connection with the clips 83. A further advantage is that the lamps may thus be very easily replaced. This feature is illustrated at the right end of Figure 8 where one of the caps and its bodily carried parts are shown removed as a unit from the cylinder.

The conduit 85 projects downwardly in Figure 8 for clarity of illustration, but preferably in actual practice will be pulled up and fastened out of the way behind the rear view mirror or along the upper edge of the rear window moulding, as the case may be.

The cut-out arrows and the cap and lamp assemblies are so related and proportioned that, when the caps are snapped into place, the lamp filaments will be disposed immediately between opaque side wall portions of the cylinder between the shanks and heads of the arrows. This is best illustrated at the left end of Figure 8, wherein a filament 86 is so disposed that there will be no concentrated glare or glow of light through the arrows when the lamps are burning. Instead, only a diffused light will pass through the arrows, with the result that all parts thereof will be sharply and uniformly outlined.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle signal comprising a tubular casing open at both ends, a partition loosely fitting said casing substantially midway between its ends, a tubular member in each end of the casing abutting at one end against the partition, a flanged cap fitting over each end of the casing and holding the tubular members, and means for securing the caps on the casing, said signal also including signaling indicia in the casing portions separated by the partition.

2. A vehicle signal comprising a tubular casing open at both ends, a partition loosely fitting said casing substantially midway between its ends, direction indicating openings in said casing on each side of said partition, a tubular transparent member in each end of the casing abutting at one end against the partition, a flanged cap fitting over each end of the casing and holding the tubular members, and means for securing the caps on the casing.

3. A direction signal comprising a partially opaque casing of substantially uniform cross section having a pair of opposed open ends, a transverse partition of substantially the same size and shape as the cross sectional area of the casing and therefore freely insertible axially of the latter, a member fitted in each end of the casing on opposite sides of the partition and designed to cooperate with the casing to form signaling indicia, and detachable caps for closing the open ends of the casing, said members each being of such length as to have its ends abut one of the caps and one side of the partition respectively, whereby the loose partition is maintained in effective position by said members and said caps.

4. In a direction signaling device, an indicating member comprising an open ended, opaque shell having signaling indicia; a partition loosely disposed in said shell; a pair of transparent members removably disposed in said shell with their adjacent ends in engagement with said partition and their opposite ends flush with the opposite ends of said shell; and removable caps each provided with a light engaged with the opposite ends of said shell.

5. In a signaling device of the character described, an elongated casing including a thin shell carrying signaling indicia, a flat partition disposed transversely of the shell with its periphery substantially in continuous contact with the inner surface of the central part of the shell, a strap encircling the central part of the shell in surrounding relation to said partition, and means for drawing the ends of the strap together to tighten the latter with respect to the shell.

SEWARD M. ROBERTS.